United States Patent
Deixler et al.

(10) Patent No.: US 12,407,376 B2
(45) Date of Patent: Sep. 2, 2025

(54) MULTIPATH CHANNEL BASED RADIO FREQUENCY BASED SENSING

(71) Applicant: SIGNIFY HOLDING B.V., Eindhoven (NL)

(72) Inventors: Peter Deixler, Arlington, MA (US); Hugo José Krajnc, Eindhoven (NL); Jaco Van Der Merwe, Kelpen-Oler (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/558,404

(22) PCT Filed: Apr. 25, 2022

(86) PCT No.: PCT/EP2022/060802
§ 371 (c)(1),
(2) Date: Nov. 1, 2023

(87) PCT Pub. No.: WO2022/233614
PCT Pub. Date: Nov. 10, 2022

(65) Prior Publication Data
US 2024/0235621 A1    Jul. 11, 2024

Related U.S. Application Data

(60) Provisional application No. 63/183,186, filed on May 3, 2021.

(30) Foreign Application Priority Data

May 17, 2021    (EP) .................................... 21174027

(51) Int. Cl.
*H04B 7/04*    (2017.01)
*H04B 7/0413*    (2017.01)

(52) U.S. Cl.
CPC ....... *H04B 7/04013* (2023.05); *H04B 7/0413* (2013.01)

(58) Field of Classification Search
CPC .. H04B 7/145; H04B 7/04013; H04B 7/0617; H04B 7/026; H04B 7/0413
See application file for complete search history.

(56) References Cited

U.S. PATENT DOCUMENTS

| | | |
|---|---|---|
| 2012/0165647 A1 | 6/2012 | Kang et al. |
| 2015/0171977 A1 | 6/2015 | Kashiwagi |

(Continued)

FOREIGN PATENT DOCUMENTS

| | | |
|---|---|---|
| JP | 2007300606 A | 11/2007 |
| JP | 2018072171 A | 5/2018 |

(Continued)

OTHER PUBLICATIONS

Hu, Jingzhi, et al., "Reconfigurable Intelligent Surface Based Rf Sensing: Design, Optimization, and Implementation," IEEE Journal on Selected Areas in Communications, vol. 38, No. 11, Nov. 2020 (17 Pages).

*Primary Examiner* — Rahel Guarino

(57) ABSTRACT

The present invention relates to an RF system (100) with a first node (10) and an RF signal diffuser (40). The first node (10) is configured for transmitting an RF signal (30). The RF signal diffuser (40) is configured for reflecting the RF signal (30) in multiple directions in order to generate additional paths (38) for a multipath channel based on the RF signal (30). The RF signal diffuser (40) and the first node (10) are arranged with a distance (50) to each other and are configured such that at least one of the additional paths (38) of the multipath channel has sufficient transmission power for performing RF-based sensing in a sensing area (60). The RF system (100) is configured for performing RF-based sensing (Continued)

based on at least two paths (36, 38) of the multipath channel including at least the one of the additional paths (38).

12 Claims, 4 Drawing Sheets

(56) References Cited

U.S. PATENT DOCUMENTS

| | | | |
|---|---|---|---|
| 2019/0178980 A1 | 6/2019 | Zhang et al. | |
| 2019/0379434 A1 | 12/2019 | Lindskog et al. | |
| 2020/0203846 A1* | 6/2020 | Harris | H04N 7/20 |

FOREIGN PATENT DOCUMENTS

| | | | |
|---|---|---|---|
| JP | 2021181997 A | 11/2021 | |
| WO | 2012169105 A1 | 12/2012 | |
| WO | 2021004981 A1 | 1/2021 | |
| WO | 2021023725 A1 | 2/2021 | |

* cited by examiner

MULTIPATH CHANNEL BASED RADIO FREQUENCY BASED SENSING

CROSS-REFERENCE TO PRIOR APPLICATIONS

This application is the U.S. National Phase application under 35 U.S.C. § 371 of International Application No. PCT/EP2022/060802, filed on Apr. 25, 2022, which claims the benefit of U.S. Provisional Patent Application No. 63/183,186, filed on May 3, 2021 and European Patent Application No. PCT/EP2022/060802, filed on May 3, 2021. These applications are hereby incorporated by reference herein.

FIELD OF THE INVENTION

The present invention relates to a radio frequency (RF) system for performing RF-based sensing, a corresponding method, and a corresponding computer program product. In particular, the invention relates to performing RF-based sensing based on a multipath channel.

BACKGROUND OF THE INVENTION

US 2019/0178980 A1 shows methods, apparatus and systems for detecting and monitoring vital signs in real time. In one example, a system for monitoring a repeating motion in a venue is disclosed. The system comprises a transmitter, a receiver, and a repeating motion monitor. The transmitter is located at a first position in the venue and configured for transmitting a wireless signal through a wireless multipath channel impacted by the repeating motion of an object in the venue. The transmitter can transmit the wireless signal via a multi-antenna array that can form a plurality of beams each of which points in a distinct direction. The receiver is located at a second position in the venue and configured for: receiving the wireless signal through the wireless multipath channel impacted by the repeating motion of the object in the venue, and obtaining a time series of channel information (CI) of the wireless multipath channel based on the wireless signal.

Hu Jingzhi et. al. discloses radio-frequency (RF) sensing techniques for human posture recognition. Conventional RF sensing techniques are constrained by their radio environments, which limit the number of transmission channels to carry multi-dimensional information about human postures. Instead of passively adapting to the environment, in Hu Jingzhi et. al., an RF sensing system for posture recognition based on reconfigurable intelligent surfaces (RISs) is designed. The proposed system can actively customize the environments to provide the desirable propagation properties and diverse transmission channels. However, achieving high recognition accuracy requires the optimization of RIS configuration, which is a challenging problem. To tackle this challenge, an optimization problem is formulated, decompose it into two subproblems and propose algorithms to solve them.

SUMMARY OF THE INVENTION

It can be seen as an object of the present invention to provide an RF system, a method, a computer program product, and a computer readable medium which allow improving RF-based sensing based on multipath channel.

In a first aspect of the present invention an RF system for performing RF-based sensing in a sensing area is presented. The RF system comprises a first node and an RF signal diffuser. The first node is configured for transmitting an RF signal. The RF signal diffuser is configured for reflecting the RF signal in multiple directions in order to generate additional paths for a multipath channel based on the RF signal. The RF signal diffuser and the first node are arranged in the RF system with a distance to each other and are configured such that at least one of the additional paths of the multipath channel has sufficient transmission power for performing RF-based sensing in the sensing area. The RF system is configured for performing RF-based sensing based on at least two paths of the multipath channel including at least the one of the additional paths.

Since the RF signal diffuser reflects the RF signal in multiple directions, a number of paths is increased by generating additional paths. Wireless energy may be essentially uniformly distributed among the additional paths. In other words, the RF system may provide an evenly-balanced wireless multipath channel for an improved RF-based sensing. This allows a uniform performance throughout the sensing area as a three-dimensionally distributed set of paths or incident waves throughout the sensing area may be ensured. In particular, this allows to improve RF-based sensing coverage by reducing a number of blind spots in the sensing area and improves occupancy detection consistency across different sub areas of the sensing area. Since the number of paths is increased, contribution of each individual path may be reduced, such that fewer or no paths skew or overly bias the RF-based sensing, e.g., performed by an RF-based sensing algorithm, such as an RF-based sensing occupancy detection algorithm.

Furthermore, high-value functions such as vital sign detection, e.g., breathing rate detection or heart rate detection, may be enabled or improved. By using the RF signal diffuser, spatial richness may be enhanced and/or fine-tuned at the level of the sensing area.

Since the RF signal diffuser reflects the RF signal in multiple directions in order to generate additional paths for the multipath channel, the first node can transmit a single beam directed at the RF signal diffuser instead of transmitting omnidirectionally or isotropically, respectively, while being able to perform RF-based sensing based on the multipath channel. In other words, the first node does not need to transmit the RF signal by a multi-antenna array in order to generate the paths of the multipath channel. Compared to transmitting the RF signal by a multi-antenna array, a simpler or at least alternative structure may be provided for generating the paths for the multipath channel.

The RF signal diffuser may be configured for reflecting the RF signal in multiple predetermined directions into the sensing area in order to generate the additional paths for the multipath channel based on the RF signal. This may allow to improve detection performance at predetermined sub areas of the sensing area to which the RF signals are reflected by the RF signal diffuser.

The RF signal diffuser may be arranged in the far-field of the first node which is configured for transmitting the RF signal. For example, the distance between the RF signal diffuser and the first node may be selected such that the RF signal diffuser is arranged in the far-field of the first node. The distance may refer, for example, to the distance of an antenna of the first node to a surface of the RF signal diffuser. Alternatively, the distance may also refer to a distance between a center of the first node to a center of the RF signal diffuser, e.g., if they are arranged in a regular grid.

The RF system may include multiple nodes, e.g., the first node for transmitting the RF signal and a receiving node for receiving the RF signal in order to perform RF-based sensing.

RF-based sensing allows for the detection of various sensing events taking place in the sensing area, i.e., a specific space or specific volume, such as a room in a building, a building, or any other space. Sensing algorithms or sensing analysis algorithms may detect and analyse how tangible entities, such as objects or users, within the sensing area affect RF signals. RF signals are used for transmitting RF messages, such as RF sensing messages specifically adapted for performing RF-based sensing, i.e., RF messages which do not include information for data exchange or communication between nodes, but only for performing RF-based sensing. RF-based sensing may be used as means for detecting and classifying sensing events, such as user activities in homes, offices, etc. For example, based on RF-based sensing messages, e.g. WiFi RF-based sensing messages, being transmitted and received by nodes in form of smart lights, RF-based sensing may determine motion in a room and turn lights on or off automatically, nodes in form of WiFi routers may estimate breathing rate of people, etc.

The underlying principle for RF-based sensing is that distortions of RF signals in a space are both a function of the tangible entities in it, e.g., moving objects, as well as of the frequency of the RF signals. RF signals or radio waves, respectively, are propagated through electromagnetic radiation and interact with an environment by reflection, refraction, diffraction, absorption, polarization, and scattering. Wireless attenuation is different for different materials within a typical frequency range used by RF-based sensing applications. Therefore, characteristics of the sensing area, e.g., a construction form of a room, a spatial arrangement, and integral-surface-area of each material type present in the sensing area may influence RF multipath signal characteristics of the sensing area. In particular, since the RF signal diffuser is arranged in the RF system, additional paths are generated for the multipath channel.

For performing RF-based sensing, one node, i.e., the first node, acts as a transmitting node transmitting RF signals to another node acting as a receiving node. The received RF signals may then be analysed. If the RF signals interact with one or more tangible entities, e.g., objects or persons, on their paths or transmission paths, respectively, between the nodes, the RF signals are disturbed, such as scattered, absorbed, reflected, or any combination thereof. The disturbances of the RF signals can be analysed and used for performing RF-based sensing. The disturbed and/or reflected RF signals can include an RF-based sensing fingerprint based on signal parameters, such as real and imaginary part of electrical permittivity and magnetic susceptibility.

The RF signal may travel from the first node to the tangible entity and be disturbed and reflected to the receiving node. These paths are denoted as original paths in the following. Additionally, the RF signal may be reflected at the RF signal diffuser before interacting with the tangible entity, i.e., being disturbed and reflected by the tangible entity to the receiving node. These paths are the additional paths generated by the RF signal diffuser. Adding additional paths allows increasing a probability that information transmitted by the first node via the RF signal is correctly received by a receiving node that receives the RF signal, i.e., a probability of information transmission. For example, if additional paths are used, risk of blockage is reduced.

The transmission power corresponds to an amount of power used for transmitting the RF signal by the first node. A higher transmission power allows to increase the probability of information transmission. For example, if the RF signal is transmitted with a transmission power, such that the RF signal received by the receiving node is equal to or lower than a noise level in the sensing area received by the receiving node, the information may be lost due to the noise. Increasing the transmission power of the RF signal by the first node may allow receiving the information even in a noisy environment.

The first node may be configured for transmitting the RF signal with a transmission power such that at least one original path, i.e., not generated by the RF signal diffuser and one additional path of the multipath channel generated by the RF signal diffuser have sufficient transmission power for performing RF-based sensing.

The first node may be configured for transmitting the RF signal with a transmission power selected based on the distance between the RF signal diffuser and the first node such that the at least one of the additional paths of the multipath channel has sufficient transmission power for performing RF-based sensing, e.g., for a targeted sensing function and/or a targeted confidence level. This may allow increasing a maximum path length for which the RF signal has sufficient transmission power for performing RF-based sensing, with the maximum path length extending between the node that transmits the RF signal to a node which receives the RF signal for performing RF-based sensing.

For example, the node may include a ZigBee or WiFi radio which may increase the transmission power. The transmission power may also be increased based on the communication technology, e.g., a wavelength, used for performing RF-based sensing. For example, for 60 GHz WiFi, a higher transmission power may be applied than for 2.4 GHZ WiFi, as absorption of 60 GHz WiFi signals in air is stronger than for 2.4 GHz. WiFi signals, such that a higher transmission power is required for 60 GHz WiFi in order to ensure information transmission between the transmitting node and the receiving node.

The first node may be configured for transmitting the RF signal directionally or omnidirectionally. Transmitting the RF signal omnidirectionally, or isotropically, respectively, by the first node lowers the transmission power of each of the paths due to dividing it between different paths before the RF signal is reflected at the RF signal diffuser. This may then cause various paths to have insufficient transmission power for performing RF-based sensing, e.g., since the transmission power is below a noise level, such that the RF signal cannot be correctly received via the path.

The first node may be configured for directionally transmitting the RF signal in a direction of the RF signal diffuser. This allows to limit the number of paths in the sensing area and may allow to reduce interference between different RF channels or wireless channels, respectively. Additionally, it allows to increase the probability of information transmission. The first node may be configured for beamforming the RF signal in order to directionally transmit it in the direction of the RF signal diffuser. The first node may be configured, for example, for emitting the RF signal in a single beam directed to the RF signal diffuser or by emitting the RF signal in a plane identical to the RF signal diffuser in order to directionally transmit the RF signal in the direction of the RF signal diffuser. If the RF signal is emitted in a plane, two or more beams may be emitted in the plane. For example, the first node and the RF signal diffuser may be arranged at a ceiling of a room. In this case, the plane may be, for example, a ceiling plane.

The first node may be configured for transmitting the RF signal including an RF sensing message.

The RF signal diffuser may have a predetermined size, a predetermined shape, or a predetermined material composition. The predetermined size, the predetermined shape and the predetermined material composition may be optimized for reflecting the RF signal in predetermined directions, e.g., adapted to the sensing area in which RF-based sensing is to be performed by the RF system. This may allow to provide a simple construction of an RF signal diffuser for generating additional paths.

The RF signal diffuser may, for example, form part of a housing of one of the nodes of the RF system. The RF signal diffuser may be formed, for example, as part of an outer surface of the housing of the node.

The RF signal diffuser may include a reflective material, e.g., a metal, on its surface for reflecting the RF signal. The reflective material may be, for example, an electromagnetic material, such as aluminum (Al). The RF signal diffuser may be coated, for example, with a reflective material, e.g., metal. This may allow for almost perfect RF signal reflection.

The RF signal diffuser may have a customized shape which is adapted to optimize a distribution of the additional paths in the sensing area based on a three dimensional (3D) model of the sensing area. This may allow to improve RF-based sensing performance, e.g., detection performance, in the sensing area. For example, the customized shape of the RF signal diffuser may be adapted such that the distribution of the additional paths in the sensing area optimizes RF-based sensing performance, e.g., a sensing resolution and/or sensing sensitivity. The number of blind spots may be reduced, for example, RF-based sensing performance may be evenly distributed over the whole sensing area, or RF-based sensing coverage of specific areas of interest may be improved. For example, if the sensing area is a room, a required RF-based sensing coverage may be higher at a table in a room at which a person works than in a corner of the room. The table in the room may be an area of interest which requires additional RF-based sensing coverage. The customized shape of the RF signal diffuser may be adapted such that additional paths cover the area of interest. In other words, the distribution of the additional paths may be optimized by adapting the customized shape of the RF signal diffuser such that more additional paths are directed to the area of interest. Further areas of interest may include, for example, a bed in which a person sleeps, e.g., for breathing rate recognition and/or sleep monitoring.

The customized shape may be provided based on 3D printing a surface of the RF signal diffuser. The RF system may, for example, optimize the distribution of the additional paths in the sensing area based on a building information model (BIM) of the sensing area, such as a room, in which the RF system is arranged. This may allow for further improving RF-based sensing performance.

The RF system may be provided with a 3D map of the sensing area. The 3D map of the sensing area may be generated, for example, using Lidar-sensing performed with a user's mobile phone. The customized shape of the RF signal diffuser may be determined and generated based on the 3D map of the sensing area. Furthermore, the material composition, position, and/or size of the RF signal diffuser may be selected based on the 3D map of the sensing area. This may allow to improve RF-based sensing performance, particularly in areas of interest. In particular, additional paths may selectively be added for particular areas of interest. In other words, the first node and the RF signal diffuser may be arranged and configured such that additional paths are generated such that an optimized RF-based sensing performance, such as sensing resolution and/or sensing sensitivity, is achieved in the sub areas of the sensing area which are of highest interest for performing RF-based sensing.

The RF signal diffuser may be configured for providing time-variant additional paths. The shape of the RF signal diffuser may be, for example, time variant, e.g., expanding and contracting over time, for example, periodically expanding and contracting. The RF signal diffuser may be or include, for example, a balloon that is periodically inflated and deflated. Additionally, or alternatively, the RF signal diffuser may be rotated along an axis for generating the time-variant additional paths. This may allow improving coverage of the sensing area as the RF signal is reflected in different directions over time. If the RF signal diffuser rotates, e.g., with a full rotation once per minute, the RF signal is reflected dynamically through the sensing area. A first sub area of the sensing area may have limited coverage when the RF signal diffuser is in a first static position, i.e., the first sub area may be a blind spot. Once the RF signal diffuser starts rotating, and an angle of the surface of the RF signal diffuser is, e.g., continuously, changed with respect to the incoming RF signal, the additional paths generated based on the reflected RF signal will accordingly swivel over the sensing area. This may allow to ensure that, for example, within a timeframe of a second at least during 10 ms the previous blind spot is covered by the RF-based sensing. Rotating the RF signal diffuser corresponds to performing multiple partially overlapping measurements in the sensing area over time. The shape of the RF signal diffuser and an adaption of the shape over time with respect to the incoming RF signal may be optimized in order to optimize sensing coverage in the sensing area. For example, parameters that adapt the shape over time with respect to the incoming RF signal like an expansion and contraction speed or rotation speed may be adapted accordingly.

The RF signal diffuser may include multiple reflective elements configured for reflecting the RF signal. Each of the reflective elements may have a size adapted to a wavelength of the RF signal used for performing RF-based sensing. This allows the wireless energy to be more uniformly distributed among the paths of the multipath channel. The size of the reflective elements may be, for example, between 0.05 and 0.2, such as between 0.1 and 0.2 times the wavelength of the RF signal used for performing RF-based sensing. This allows to avoid phase distortion of paths of the RF signal or RF signals. Wave changes may occur when a reflective element is comparable to or larger than the wavelength of an incident RF signal. The size of the reflective elements may be, for example, 1 cm to 2 cm for RF signals in form of WiFi at 2.4 GHZ, which have a wavelength of 12 cm.

One or more of the reflective elements may be configured for providing the time-variant additional paths. For example, the one or more of the reflective elements may adapt its shape or orientation on the RF signal diffuser, e.g., a surface of the RF signal diffuser, over time. The shape of the one or more of the reflective elements may be adapted, for example, between convex and concave, e.g., based on piezoelectric effect. The orientation of the one or more of the reflective elements may be adapted, for example, by rotating the one or more of the reflective elements on the surface of the RF signal diffuser. For example, the one or more of the reflective elements may change its orientation between pointing vertically and horizontally. The shape or orientation of the one or more of the reflective elements may be adapted, for example, according to predetermined rules, e.g., periodically. The reflective elements may adapt their shape or orientation independently from each other or in a concerted manner, e.g., all reflective elements or groups of reflective elements adapting their shape or orientation over time.

The RF signal diffuser may, for example, have an icosahedron shape, e.g., a regular icosahedron shape with 64 reflective elements arranged on the surface of the icosahedron. This allows 15 to 100 paths to be received by the receiving node for performing RF-based sensing. In other words, in this case 15 to 100 paths may contribute to the RF-based sensing.

The RF signal diffuser may also have a form of, for example, a heatsink, a trim ring of a downlight with reflective elements, or a special spring structure of a recessed-mounted downlight. The heatsink may be, for example, a specially designed thermal LED heatsink, e.g., including a rugged 3D metallic surface, which may act as a diffuser structure. In case that the RF system is arranged in a sensing area in form of a room of a building and the RF signal diffuser in form of a heatsink is arranged around the receiving node, the heatsink may, for example, be designed to be exposed toward a floor rather than a ceiling. This may allow exposing an antenna of the receiving node used for receiving the RF signal to the floor such that it is able to receive RF signals reflected by an object in the room while the RF signal transmitted by the first node are reflected by the RF signal diffuser to generate additional paths for the multipath channel.

Alternatively, the antenna of the receiving node and the RF signal diffuser may also be arranged at slightly different positions, e.g., as in case of the reflective elements of the RF signal diffuser being arranged at a trim ring of a downlight. The RF signal diffuser may be arranged, for example, a few cms apart from the antenna. This allows ensuring that the RF signal may be received by the antenna while additional paths for the multipath channel can be generated.

Yet alternatively, the RF signal diffuser may also be arranged between a position of the first node and a position of the receiving node. For example, the RF signal diffuser may have a discoball-like shape, i.e., a spherically shaped surface on which reflective elements are, e.g., evenly, distributed. The RF signal diffuser with the discoball-like shape may be configured for rotating along an axis, e.g., axial axis, for generating time-variant additional paths. This may allow to further improve RF-based sensing. In particular, coverage of the sensing area may be improved.

The RF signal diffuser with a discoball-like shape may also be included in the receiving node, e.g., arranged around or as part of the receiving node. In this case, the spherically shaped surface may include areas with reflective elements for reflecting the RF signal and areas without reflective elements for allowing the RF signal to arrive at an antenna of the receiving node arranged inside of the RF signal diffuser. Alternatively, the antenna of the receiving node may also be arranged outside of the discoball-like shaped RF signal diffuser.

Furthermore, in other embodiments, the RF signal diffuser may have another shape, e.g., a parabolic mirror-like shape, in which the RF signal enters the RF signal diffuser in a first direction and exits it in one or more other directions. This may allow improving the generation of additional paths, in particular by adapting a shape of the RF signal diffuser to a sensing area, such that RF-based sensing coverage is improved for blind spots or areas of interest.

The shape of the RF signal diffuser may depend on the distance between the RF signal diffuser and the first node. Alternatively, or additionally, the shape of the RF signal diffuser may depend on a spatial arrangement of the nodes of the RF system. Alternatively, or additionally, the shape of the RF signal diffuser may depend on a directionality of the RF signal transmitted by the first node. The shape of the RF signal diffuser may also depend on a directionality of the receiving node which receives the RF signal. The directionality of the receiving node may relate to a directionality of a receiving antenna which receives the RF signal.

The RF signal diffuser may be arranged, for example, at a ceiling of a room. The first node may be provided in form of a suspended luminaire, which is arranged at the ceiling below the RF signal diffuser with a distance in vertical direction, e.g., in the far field. The RF signal may be transmitted by the first node in the vertical direction to the RF signal diffuser.

The RF signal diffuser may be optimized for a specific distance to the first node and may be arranged accordingly in the specific distance from the first node. The RF signal diffuser may have optimized reflective areas and/or the receiving node may have optimized antenna effective areas. For instance, the RF signal diffuser may be optimized according to a spatial arrangement of the nodes and the RF signal diffuser in the RF system. This may particularly be beneficial in professional environments like offices and parking lots which use only a couple of well-defined standardized spacings between nodes, i.e., having predetermined distances between the nodes. Predetermined distances between the nodes may correspond, for example, to the distances between the transmitting antennas of the transmitting node and the receiving antennas of the receiving node. This may enable to limit a number of different RF signal diffusers which are optimized according to the spatial arrangement of the nodes and the RF signal diffuser in the RF system. The RF signal diffuser may be configured based on a BIM model of the sensing area. For example, the shape of the RF signal diffuser and arrangement of the RF signal diffuser and/or nodes of the RF system may be optimized based on the BIM model of the sensing area, such as a room.

A number of the reflective elements, a size of the reflective elements, a material of the reflective elements, spatial orientations of the reflective elements, or any combination thereof may depend on the distance, a transmission angle, or the distance and the transmission angle between the RF signal diffuser and the first node.

The transmission angle relates to a spatial orientation of the RF signal arriving at the RF signal diffuser with respect to the orientation of the RF signal diffuser. In other words, the transmission angle corresponds to a directionality of the RF signal transmitted by the first node with respect to the RF signal diffuser. For instance, the RF signal diffuser may be oriented such the RF signal arrives via a grazing angle to a surface of the RF signal diffuser. The spatial orientation of the reflective elements may, for example, be adapted accordingly in order to improve generation of additional paths in predetermined directions.

The number of the reflective elements, the size of the reflective elements, the material of the reflective elements, the spatial orientations of the reflective elements, or any combination thereof may alternatively, or additionally, depend on a spatial arrangement of the nodes of the RF system. The number of the reflective elements, the size of the reflective elements, the material of the reflective elements, the spatial orientations of the reflective elements, or any combination thereof may alternatively, or additionally, depend on the directionality of the receiving node which receives the RF signal.

The RF system may be configured for performing the RF-based sensing based on the RF signal including a predefined chirp. This allows an improvement of the sensitivity which may enable RF-based sensing to extract motion information from lower signal levels, as well as in cases with more noise. Performing RF-based sensing based on the RF signals including the predefined chirp may be particularly beneficial for RF signals that that have reduced RF sensing signal levels due to being spread more broadly by the RF signal diffuser, e.g., 60 GHz WiFi which is strongly absorbed by oxygen in the air.

The RF system may be configured for modulating the RF signal based on the Chirp Spread Spectrum (CSS) modulation technique for encoding data, such as RF sensing messages, as frequency varying chirps. The RF system may be configured for performing RF-based sensing by utilizing a ratio of two paths of the RF signal simultaneously received by two different antennas of the receiving node. The antennas may share the same clock and thus have an identical carrier frequency offset (CFO) and an identical sampling frequency offset (SFO). Utilizing the ratio of the two paths of the RF signal simultaneously received by the two different antennas of the receiving node thus allows removing varying random frequency offsets which may occur due to the first node and the receiving node being not time synchronized. Furthermore, for a far away moving object, such as a person, that reflects the RF signal, the reflected RF signal becomes weak and can be easily buried in noise. The ratio of the two paths allows to cancel out the noise and to obtain a ratio which shows an improved variation pattern corresponding to movement of the far away object. This may allow to increase the RF-based sensing range. Utilizing the ratio of the two paths may allow to accurately track distance and direction of the moving object.

The RF system may include an RF sensing algorithm configured for utilizing an orthogonality within the RF signal including the chirp for performing RF-based sensing. For example, the RF system may be configured for performing RF-based sensing for breathing rate recognition. The RF sensing algorithm may be configured for utilizing the orthogonality within the RF signal including the chirp for looking for correlation and thereby retrieving the paths of the RF signal caused by the breathing motion which would otherwise be suppressed by noise. This may allow performing RF-based sensing over longer distances and may allow performing RF-based sensing even through walls. Furthermore, lower transmission power RF signals may be used for performing RF-based sensing.

The RF system may be configured for performing RF-based sensing using the RF sensing algorithm configured for utilizing the orthogonality within the RF signal including the chirp. This may be particularly beneficial for specific cases where the proposed RF signal diffuser substantially lowers the transmission power of the RF sensing signal arriving at the receiving node. This may allow improving the sensitivity of the receiving node, e.g., enabling RF-based sensing for extracting motion information from lower transmission power RF signal.

The RF system may be configured, for example, for performing RF-based sensing based on the method for performing RF-based sensing based on chirp-based LoRa signals as disclosed in section 2 of "Exploring LoRa for Long-range Through-wall Sensing" published by F. Zhang et al. in Proc. ACM Interact. Mob. Wearable Ubiquitous Technol., Vol. 4, No. 2, Article 68 which is incorporated herein by reference.

The RF signal diffuser may be configured for reflecting RF signals of a first wavelength and for absorbing RF signals of a second wavelength. This allows the RF signal diffuser to be selective for specific wavelengths of the RF signals and thus for specific communication technologies, e.g., 2.4 GHz WiFi or 60 GHz WiFi. This may allow suppressing noise provided by RF signals of a communication technology for which the RF signal diffuser is not selective while improving the RF signals for the communication technology for which the RF signal diffuser is selective. The first wavelength may correspond, for example, to a first frequency, e.g., 2.4 GHZ and the second wavelength may correspond, for example, to a second frequency, e.g., 60 GHz WiFi. The RF signal diffuser may include, for example, a material configured for reflecting the first wavelength and absorbing the second wavelength. The material may form a coating on at least a part of the surface of the RF signal diffuser.

The RF system may be configured for performing the RF-based sensing based on channel state information (CSI), i.e., CSI-based sensing. Alternatively, the RF system may be configured for performing the RF-based sensing based on received signal strength indication (RSSI), i.e., RSSI-based sensing.

Both RSSI and CSI are metrics that are extracted from an RF message transmitted on an RF channel and therefore are a function of the RF message. RSSI is a measurement of an overall attenuation of a wireless communication link between two nodes. In other words, RSSI is a coarse measurement of an amount of power the node estimates when it starts receiving an RF message, i.e., RSSI corresponds to an average amount of power of the RF message. CSI, e.g., WiFi CSI, represents how RF signals propagate in an RF channel between the transmitting node and the receiving node at certain carrier frequencies along multiple spatial paths and which represents an impact a tangible entity has along different frequencies. In other words, CSI is a metric which is extracted from subcarriers used to modulate and demodulate an RF message, e.g., a WiFi RF message. These subcarriers represent different parts of the spectrum of the RF channel itself resulting in more data points per RF message than with RSSI. CSI captures RF characteristics of nearby environment as CSI's amplitude and phase are impacted by multi-path effects including amplitude attenuation and phase shift of the RF signals.

A time-series of multiple CSI measurements captures how RF signals travel through surrounding tangible entities, such as physical objects and humans, in time, frequency, and spatial domains. Transmitting RF signals through a multipath channel and using analysis algorithms, such as artificial intelligence analysis algorithms, for analysing the time-series of multiple CSI measurements may enable a wide range of different wireless sensing applications. For example, CSI amplitude variations in the time domain may have different patterns for different humans, activities, gestures, or the like, which may be used for human presence detection, motion detection, activity recognition, gesture recognition, and human identification.

Observed CSI phase shifts in spatial and frequency domains, i.e., transmit/receive antennas and carrier frequencies, are related to signal transmission delay and arrival direction, which may be used for leveraging RF-based sensing—in addition to occupancy and activity detection—also for human localization and tracking across the sensing area, e.g., a building space.

CSI phase-shifts in time domain may have different dominant frequency components which, for instance, may be used to estimate a breathing rate when performing CSI-based sensing.

As both CSI-based sensing and RSSI-based sensing may rely on a same physical radio, e.g., if both are extracted from the same protocol, such as WiFi, and as the same RF messages may be analysed for both to probe the sensing area, the physics of signal-propagation of the two RF-based sensing methods may be identical, i.e., the multipath channel within the sensing area does not change just because either CSI data or RSSI data is extracted from the radio.

In addition, both RSSI-based sensing and CSI-based sensing analyses the time series of the RF channel between the two nodes. Compared to an RSSI-based sensing algorithm, a CSI-based sensing algorithm may extract metrics from each of different WiFi subcarriers which may be related to the multipath characteristics of the sensing area, e.g., physical building space or RF signal diffuser arranged in the RF system.

CSI amplitude and phase are impacted by RF signals from multiple paths within the sensing area rather than a single RF path. For example, RSSI is a simple measurement natively performed by any RF radio for 'house-keeping' purposes. In contrast, for performing CSI-based sensing using WiFi, multipath information has to be first derived from measured raw CSI data as provided by a WiFi microcontroller. For instance, a 20 MHz WiFi channel may have 64 CSI subcarrier frequencies. Since each of these sub-frequencies interact different with tangible entities, such as material objects, e.g., a brick wall of a room or upholstery of a couch, the analysis of how the 64 subcomponents integrally behave, e.g., their relative differences, may be indicative of multipath behaviour of the sensing area.

The RF system may include a second node configured for performing RF-based sensing. The second node may include the RF signal diffuser. This allows providing an improved RF system for performing RF-based sensing. The second node may be configured for receiving the at least two paths of the multipath channel for performing RF-based sensing. The second node may act as receiving node in this case.

The RF system may include a third node configured for receiving the at least two paths of the multipath channel for performing RF-based sensing. The third node may act as receiving node in this case. Alternatively, or additionally, the second node and/or the first node may act as receiving nodes. The first node, the second node, and the third node may be arranged at different positions.

The nodes of the RF system may be arranged in a regular grid with predetermined distances to their respective nearest neighbor nodes. This may allow to provide a grid of scattered RF beams creating a rich multipath environment for RF-based sensing. The predetermined distances of the respective nodes to their respective nearest neighbor nodes may correspond to distances between respective antenna arrays of the nodes. The nodes of the regular grid may have a predetermined number of nearest neighbor nodes. Nodes at edges or corners of the regular grid may have a lower number of nearest neighbor nodes than nodes at the center of the regular grid. The regular grid, may be, for example, a square grid. In this case, a node at a center of the regular grid has four nearest neighbor nodes, a node at an edge has three nearest neighbor nodes, and a node at a corner has two nearest neighbor nodes. Alternatively, the regular grid may be, for example, a triangular grid, or may have any other regular grid geometry. The regular grid may be a two-dimensional (2D) or 3D grid.

Each of the nodes of the RF system may include an RF signal diffuser configured for reflecting the RF signal in multiple directions in order to generate further additional paths for the multipath channel based on the RF signal. This may allow to further increase the number of paths for the multipath channel and may further improve the RF-based sensing performance.

The nodes may be arranged, e.g., mounted, at a ceiling of a sensing area, e.g., a room. The nodes may also be arranged on any other height, e.g., mounted at a wall or the like.

The RF system may be configured for performing RF-based sensing based on, for example, 2.4 GHz WiFi, or 5.925 GHz to 7.125 GHz WiFi, i.e., WiFi6E. The first node may be configured for directionally transmitting, e.g., focusing, the RF signal in form of a wireless beam on the RF signal diffuser. The RF signal diffuser may be made from metal with an irregular shape and reflective elements in form of metallic sub-surfaces may be configured, e.g., oriented, to reflect the RF signal to different directions in the sensing area. Performing RF-based sensing with higher frequencies allows to use smaller reflective elements and to reduce the distance between the first node and the RF signal diffuser while keeping them in the far field of each other.

In a further aspect of the present invention a method for operating an RF system for performing RF-based sensing in a sensing area is presented. The method comprises the steps:
arranging a first node configured for transmitting an RF signal,
arranging an RF signal diffuser configured for reflecting the RF signal in multiple directions in order to generate additional paths for a multipath channel based on the RF signal with a distance to the first node and configuring the RF signal diffuser and the first node such that at least one of the additional paths of the multipath channel has sufficient transmission power for performing RF-based sensing in the sensing area, and
performing RF-based sensing by the RF system based on at least two paths of the multipath channel including at least the one of the additional paths.

The method may comprise one or more of the steps:
selecting a transmission power for the RF signal based on the distance between the RF signal diffuser and the first node such that the at least one of the additional paths of the multipath channel has sufficient transmission power for performing RF-based sensing,
transmitting the RF signal with the transmission power selected based on the distance between the RF signal diffuser and the first node such that the at least one of the additional paths of the multipath channel has sufficient transmission power for performing RF-based sensing,
directionally transmitting the RF signal by the first node in a direction of the RF signal diffuser,
providing the RF signal diffuser with a customized shape which is adapted to optimize a distribution of the additional paths in the sensing area based on a three dimensional model of the sensing area,
providing the RF signal diffuser with multiple reflective elements configured for reflecting the RF signal,
providing that each of the reflective elements has a size adapted to a wavelength of the RF signal used for performing RF-based sensing,
providing the RF signal diffuser with a number of the reflective elements, a size of the reflective elements, a material of the reflective elements, spatial orientations of the reflective elements, or any combination thereof based on the distance, a transmission angle, or the distance and the transmission angle between the RF signal diffuser and the first node, performing the RF-based sensing based on predefined RF signals including a chirp, configuring the RF signal diffuser for reflecting RF signals of a first wavelength and for absorbing RF signals of a second wavelength, providing a second node configured for performing RF-based sensing with the RF signal diffuser, arranging the nodes of the RF system in a regular grid with predetermined distances to their respective nearest neighbor nodes, and providing each of the nodes with an RF signal diffuser configured for reflecting the RF signal in multiple directions in order to generate further additional paths for the multipath channel based on the RF signal.

In a further aspect of the present invention a computer program product for performing RF-based sensing in a sensing area is presented. The computer program product comprises program code means for causing a processor to carry out the method provided above, or any embodiment of the method, when the computer program product is run on the processor.

In a further aspect a computer readable medium having stored the computer program product provided above is presented. Alternatively, or additionally, the computer readable medium can have the computer program product according to any embodiment of the computer program product stored.

It shall be understood that the RF system, the method, the computer program product, and the computer readable medium discussed above have similar and/or identical preferred embodiments.

It shall be understood that a preferred embodiment of the present invention can also be any combination of the above embodiments.

These and other aspects of the invention will be apparent from and elucidated with reference to the embodiments described hereinafter.

DETAILED DESCRIPTION OF EMBODIMENTS

Figure 1:
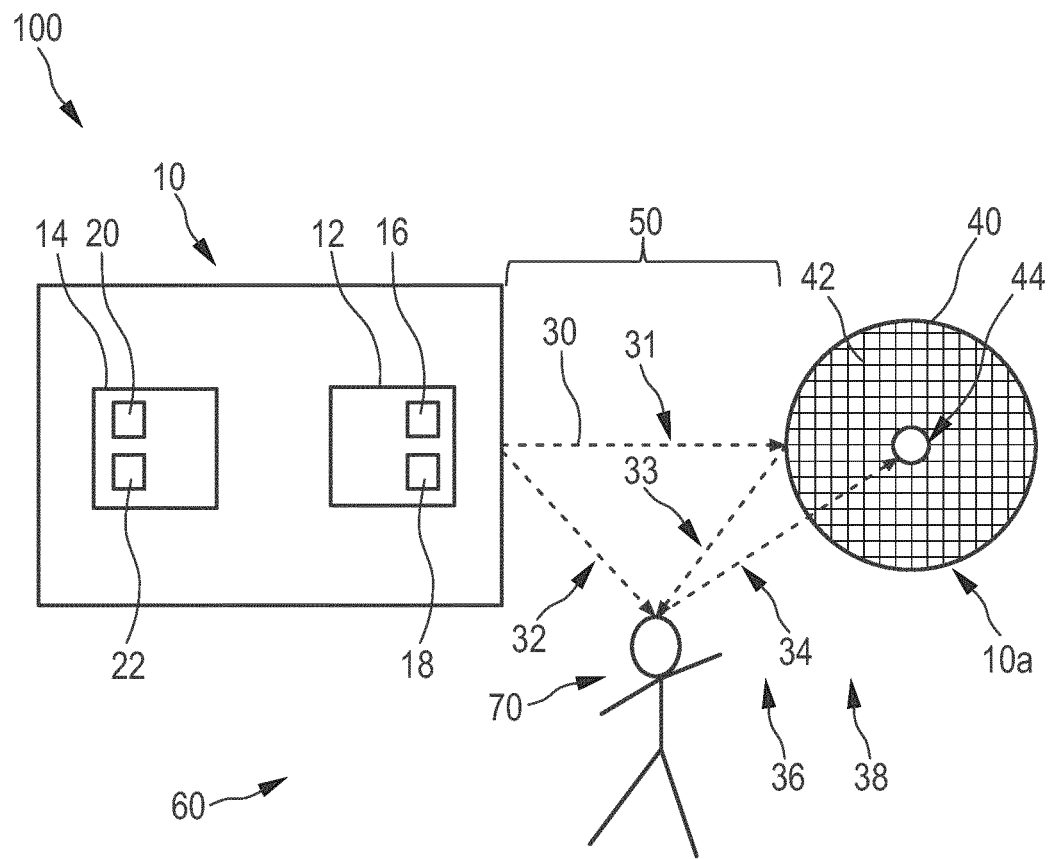
FIG. 1 shows schematically and exemplarily a first embodiment of an RF system.

FIG. 1 shows schematically and exemplarily a first embodiment of an RF system in form of a connected lighting (CL) system 100.

The CL system 100 includes a first node in form of a first luminaire 10, a second node in form of a second luminaire 10a, and an RF signal diffuser 40. In this embodiment, the second luminaire 10a includes the RF signal diffuser 40. In other embodiments, the RF signal diffuser may also be arranged separately of the second luminaire.

The CL system 100 is arranged in a sensing area 60. The luminaires 10 and 10a of the CL system 100 may provide lighting in the sensing area 60. Additionally, the CL system 100 may be used for performing RF-based sensing in the sensing area 60 in order to detect sensing events associated with a tangible entity in form of user 70. The sensing events may include, movement detection, breathing detection, occupancy detection or any other sensing event.

For RF-based sensing, e.g., WiFi CSI-based sensing, it is desirable to create as many spatially different paths as possible between two nodes acting as RF-based sensing pair. The CL system 100 may be used for increasing a number of paths of a multipath channel since the RF signal diffuser 40 may generate additional paths by reflecting incident RF signals.

Furthermore, it is desirable that the transmission power of the RF signals is uniformly distributed among the various paths in order to achieve a good sensing coverage, i.e., by removing blind spots, as well as achieving consistent sensing event detection, such as occupancy detection, across different sub areas of the sensing area. For example, in a sensing area in form of a room with two entrances, a non-uniformly distributed transmission power across different paths of the multipath channel may cause RF-based sensing to be more sensitive to motion from a user entering via a first entrance than for a second entrance. This may result in an inconsistent detection latency between the entrances. Non-uniformly distributed transmission power across the paths of the multipath channel may also cause coverage issues for more advanced RF-based sensing features related to, for example, heartrate detection or breathing detection.

The CL system 100 uses the RF signal diffuser 40 for generating at the level of the sensing area 60, e.g. at room level, additional paths. The additional paths may be generated such that each of them has sufficient transmission power for performing RF-based sensing. This allows reducing or removing blind spots.

In the following the CL system 100, and in particular its functionality is described in further detail.

The first luminaire 10 acts as a transmitting node and the second luminaire 10a acts as a receiving node of the CL system 100. The first luminaire 10 transmits an RF signal 30 which travels via different paths 36 and 38 to the second luminaire 10a. In other embodiments, the RF system may also include further nodes, e.g., a third node, and the third node may act as receiving node.

The RF signal diffuser 40, in this embodiment, forms an outer surface of the second luminaire 10a. Multiple reflective elements 42 are arranged on the outer surface, each of which reflects the RF signal 30 in order to generate the additional paths, such as additional path 38, for the multipath channel based on the RF signal 30. In other embodiments, each of the reflective elements may have a size adapted to a wavelength of the RF signal used for performing RF-based sensing. The size may, for example, be between 0.1 and 0.2 times the wavelength of the RF signal used for performing RF-based sensing. A number of the reflective elements, a size of the reflective elements, a material of the reflective elements, spatial orientations of the reflective elements, or any combination thereof may depend on a distance, a transmission angle, or the distance and the transmission angle between the RF signal diffuser and the first node. The RF signal diffuser and in particular the reflective elements may also be configured for reflecting RF signals of a first wavelength or first wavelength range and absorbing RF signals of a second wavelength or second wavelength range.

The RF signal diffuser 40, furthermore, includes a hole 44. In other embodiments, more than one holes may be included in the surface of the RF signal diffuser.

The RF signal diffuser 40 is arranged in a distance 50 from the first luminaire 10. In this embodiment, the distance 50 corresponds to a distance between an end of an antenna array 20 of the first luminaire 10 and an outer surfaces of the RF signal diffuser 40. Other distances, e.g., between the transmitting antenna and receiving antenna may also be considered (not shown). The distance 50 is selected such that the RF signal diffuser 40 is arranged in the far field of the first luminaire 10. Furthermore, the distance 50 between the RF signal diffuser 40 and the first luminaire 10 is selected and the RF signal diffuser 40 and the first luminaire 10 are configured such that at least one additional path of the multipath channel has sufficient transmission power for performing RF-based sensing. In other words, both, the distance, as well as further configuration parameters of the first luminaire 10 and the RF signal diffuser 40 are adapted such that at least one additional path of the multipath channel, e.g., additional path 38, has sufficient transmission power for performing RF-based sensing. For example, the first luminaire 10 may transmit the RF signal 30 with a transmission power selected based on the distance 50 between the RF signal diffuser 40 and the first luminaire 10 such that the additional path 38 has sufficient transmission power for performing RF-based sensing.

The first luminaire 10 comprises a control unit 12 and a communication interface 14. The second luminaire 10a also comprises a control unit and a communication interface (not shown). Furthermore, both luminaires 10 and 10a include a lighting unit with a lighting element for providing lighting (not shown). The lighting element of the second luminaire 10a is arranged such that it provides light through the hole 44 (not shown).

The control unit 12 includes a processor 16 and a computer readable medium in form of memory 18.

The memory 18 of the control unit 12 stores a computer program product for operating the CL system 100. The computer program product includes program code means for causing processor 16 to carry out a method for performing RF-based sensing, when the computer program product is run on the processor 16, e.g., the embodiment of the method for performing RF-based sensing as presented in FIG. 4. The memory 18 further includes a computer program product for operating the first luminaire 10, and the second luminaire 10a, and optionally also the whole CL system 100, respectively, e.g., for controlling the functions of the luminaires of the CL system 100, for example, in order to perform an action in reaction to the event detected by the RF-based sensing, such as providing lighting as well as for performing RF-based sensing.

The communication interface 14 includes an antenna array 20 and a transceiver in form of a WiFi transceiver 22. Instead of an antenna array, a single antenna, two antennas, or any other number of antennas may also be included in the communication interface.

The WiFi transceiver 22 is used for transmitting and receiving RF signals including RF messages based on WiFi, i.e., WiFi RF messages. In other embodiments, the communication interface may also exchange data based on one or more other communication protocols, such as Thread, Zigbee, cellular radio, Bluetooth, BLE, or any other communication protocol. The communication interface may also include two or more transceivers configured for exchanging data based on different communication protocols.

The communication interface 14 uses the antenna array 20 for transmitting the RF signals to nodes and receiving RF signals from nodes of the CL system 100, respectively, for exchanging data including the RF messages wirelessly between the nodes and for performing RF-based sensing. The transmitted RF signals may be chirped RF signals, i.e., they may include a predefined chirp.

In the situation shown in FIG. 1, the first luminaire 10 transmits the RF signal 30 to the second luminaire 10a via various paths. An original path 36 and an additional path 38 generated by the RF signal diffuser 40 are shown in FIG. 1. The original path 36 includes sub-paths 32 and 34. Original paths correspond to the paths of the RF signal 30 which do not include sub-paths reflected by the RF signal diffuser 40. The additional path 38 includes sub-paths 31, 33, and 34.

In the following it is described how the first luminaire 10 transmits the RF signal 30 to the second luminaire 10a in order to perform RF-based sensing in the CL system 100.

The first luminaire 10 transmits the RF signal 30 in multiple directions, in this embodiment. In other embodiments, the first node may be configured for directionally transmitting the RF signal in a direction of the RF signal diffuser, e.g., based on beamforming. From the multiple directions, sub-paths 31 and 32 are shown. In sub-path 31, the first luminaire 10 transmits the RF signal 30 in the direction of the RF signal diffuser 40. The RF signal diffuser 40 reflects the RF signal 30 in multiple directions in order to generate additional paths based on the RF signal 30. Sub-path 33 which is reflected from the RF signal diffuser 40 to the user 70 is shown. In sub-path 32 the first node 10 transmits the RF signal 30 to the user 70.

The user 70 disturbs the RF signal 30 received via the sub-paths 32 and 33 and scatters it along sub-path 34. Sub-path 34 extends from the user 70 to the hole 44 in the second luminaire 10a. In the hole 44 the RF signal 30 is received by the receiving antenna array of the second luminaire 10a and analysed by its control unit for performing RF-based sensing.

In this embodiment, the control unit of the second luminaire 10a performs RF-based sensing based on the original path 36 and the additional path 38. Performing RF-based sensing based on at least one of the additional paths, e.g., additional path 38, generated by the RF signal diffuser allows improving RF-based sensing performance, e.g., RF-based sensing sensitivity. In other embodiments, the RF system may perform RF-based sensing based on further paths, in particular, based on at least two paths of the multipath channel including at least the one of the additional paths.

In other embodiments, the RF signal diffuser may have a customized shape. The customized shape may be adapted to optimize a distribution of the additional paths in the sensing area based on a 3D model of the sensing area, e.g., a BIM model.

The RF signal diffuser may also be configured for providing time-variant additional paths. For example, the shape of the RF signal diffuser may change over time, e.g., expand and contract periodically, such as for a balloon. Additionally, or alternatively, the RF signal diffuser may also rotate along an axis for providing the time-variant additional paths.

Figure 2:
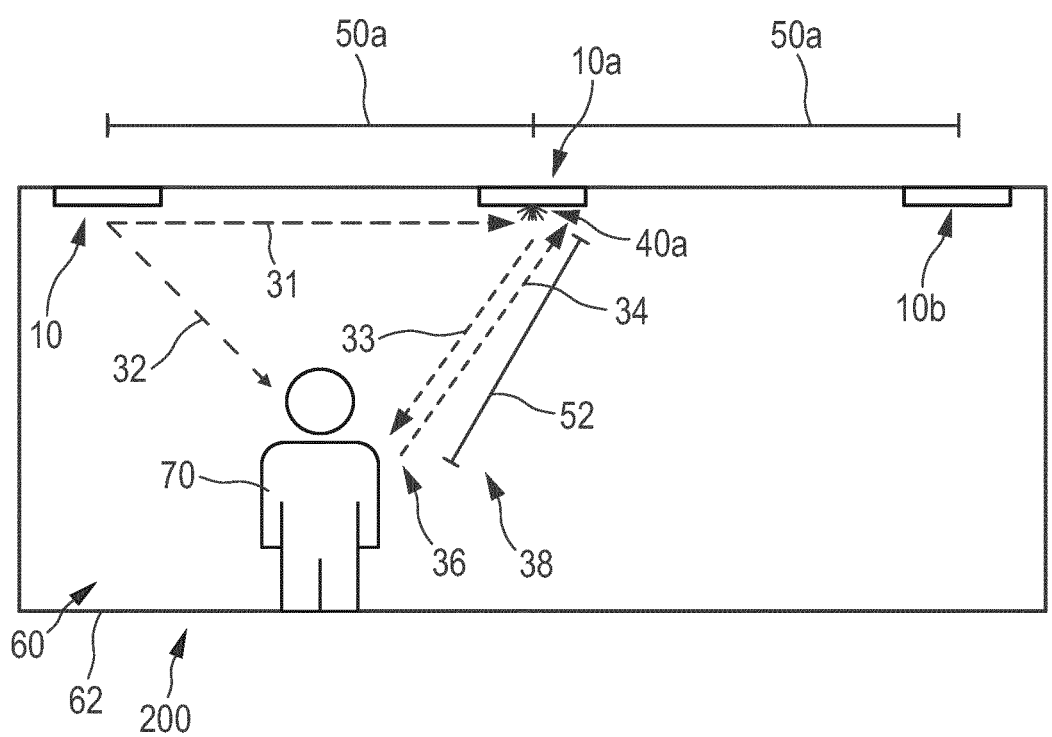
FIG. 2 shows schematically and exemplarily a second embodiment of an RF system.

FIG. 2 shows a second embodiment of the RF system in form of CL system 200 for performing RF-based sensing in a sensing area 60 in a room 62 and for providing lighting in the room 62. In this embodiment, the CL system 200 includes a first node in form of luminaire 10, a second node in form of luminaire 10a, and a third node in form of luminaire 10b. The nodes 10, 10a, and 10b are arranged in a regular grid with a predetermined distance 50a of 2 m to their respective nearest neighbors. The predetermined distance 50a corresponds to a distance between respective antenna arrays of the nodes. In other embodiments, the nodes may be arranged in other predetermined distances.

In this embodiment, the second luminaire 10a includes an RF signal diffuser 40a for reflecting an RF signal transmitted by the first luminaire 10. The first luminaire 10 acts as transmitting node and the second luminaire 10a acts as receiving node in the situation shown in FIG. 2.

As described for CL system 100, the first luminaire 10 transmits the RF signal along multiple paths, including original path 36 and additional path 38. Original path includes sub-paths 32 and 34 while additional path 38 includes sub-paths 31, 33, and 34. The distance 52 between user 70 and luminaire 10a is 1.5 m in the situation shown in FIG. 2.

In the following we assess the required conditions for the RF signal diffuser 40a to contribute to the RF-based sensing. In other words, we determine a transmission power of the RF signal transmitted by the first luminaire 10 which is required to allow performing RF-based sensing at the second luminaire 10a. Therefore, in the following it is mathematically shown that the RF signal transmitted by the first luminaire 10, scattered by the RF signal diffuser 40a, and then disturbed by the user 70 can in the end still be received at the location of the second luminaire 10a with sufficient remaining transmission power to allow for performing RF-based sensing.

For the calculations the following assumptions are made, namely, that the luminaires 10, 10a, and 10b are ceiling mounted luminaires and that they have the predetermined distance 50a of 2 m between adjacent luminaires. The RF signal diffuser 40 is thus arranged in the far field of the first luminaire 10 which transmits the RF signal or the transmitting antenna of the first luminaire 10, respectively. Furthermore, it is assumed that the first luminaire 10 transmits the RF signal with a transmission power of 20 dBm.

The transmission parameters of the first luminaire are listed in the following for two different WiFi communication technologies, namely 2.4 GHz and 5 GHZ:

| parameter | value at 2.4 GHz | value at 5 GHz |
|---|---|---|
| transmission frequency | 2.4 GHz | 5 GHz |
| transmission power | 20 dBm | 20 dBm |
| wavelength | 12.5 cm | 6.25 cm |

The same calculation may also be performed for other communication technologies, e.g., Zigbee or the like.

Since the RF signal will be reflected by the RF signal diffuser in the second luminaire, the RF signal diffuser can be understood as a new type of transmitter where the amount of transmission power is determined by a size of the reflective element which reflects the RF signal and a transmission angle at which the incoming RF signal arrives at the RF signal diffuser:

| parameter | value at 2.4 GHz | value at 5 GHz |
|---|---|---|
| size of reflective element | 2.5 cm | 1.25 cm |
| transmission angle | 45° | 45° |
| power density at RF signal diffuser at 2 m distance (Rx) | 4.99 dBmW/m$^2$ | 12.99 dBmW/m$^2$ |
| power density from RF signal diffuser at 2 m distance (Tx) | −12.21 dBmW/m$^2$ | −4.21 dBmW/m$^2$ |

The size of the reflective elements corresponds to 0.2 times the wavelength of the RF signal used for performing RF-based sensing. This allows avoiding phase distortions. A worst case scenario transmission angle is assumed. The power density at the RF signal diffuser at 2 m distance (Rx), i.e., as receiver, is determined based on antenna theory calculations. The power density at the RF signal diffuser at 2 m distance (Tx), i.e., as transmitter, is determined based on the monostatic radar equation.

The RF signal gets reflected by the RF signal diffuser and is disturbed by a user in a distance of 1.5 m from the second luminaire. The RF signal is reflected back by the user and arrive back at the second luminaire for processing it in order to perform RF-based sensing. This means that, following the same approach as before, the RF signal leaves the user with:

| parameter | value at 2.4 GHz | value at 5 GHz |
|---|---|---|
| radar cross-section of person | 0.1 m$^2$ | 0.1 m$^2$ |
| power density at user at 1.5 m distance (Rx) | −26.72 dBmW/m$^2$ | −18.72 dBmW/m$^2$ |
| power density from user at 1.5 m distance (Tx) | −36.72 dBmW/m$^2$ | −28.72 dBmW/m$^2$ |

The power density at the user at 1.5 m distance (Rx), i.e., as receiver, is determined based on antenna theory calculations. The power density from the user at 1.5 m distance (Tx), i.e., as transmitter, is determined by the monostatic radar equation.

The RF signal reflected by the user finally is received by the second luminaire with:

| parameter | value at 2.4 GHz | value at 5 GHz |
|---|---|---|
| receive antenna effective area | −29.05 dBm$^2$ | −57.01 dBm$^2$ |
| power density at second luminaire at 1.5 m distance (Rx) | −51.24 dBmW/m$^2$ | −43.24 dBmW/m$^2$ |
| transmission power received by second luminaire | −80.30 dBm | −100.25 dBm |

The receive antenna effective area is assumed as omnidirectional antenna. The power density at the second luminaire at 1.5 m distance (Rx), i.e., as receiver, is determined based on antenna theory calculations.

In the following the received transmission power is compared to the receiver sensitivity assumed for exemplary integrated circuits (ICs):

| parameter | value at 2.4 GHz | value at 5 GHz |
|---|---|---|
| transmission power received by second luminaire | −80.30 dBm | −100.25 dBm |
| receiver sensitivity | −100 dBm | −110 dBm |

We can conclude from this calculation that since the transmission power of the RF signal received by the second luminaire is higher than the receiver's sensitivity, RF messages can be decoded properly by the second luminaire. In other words, our assessment proves that the RF signal diffuser contributes to the RF-based sensing by providing additional paths for the multipath channel.

The above calculation may be repeated with other predetermined distances between the nodes, as well as to the user and different transmission angle, as well as different arrival conditions in order to determine a transmission power of the first luminaire which is sufficient for performing RF-based sensing based on the distance between the first luminaire and the RF signal diffuser. Alternatively, also the third luminaire 10b may be used as receiving node.

The control unit of the receiving node may perform RF-based sensing based on the RF signal received via multiple paths. For example, the control unit may determine signal quality parameters of the RF signal, and in particular, signal quality parameters of the RF message. This allows performing RF-based sensing based on enriched multipath information.

In a further embodiment the RF system may be configured for performing RF-based sensing, for example, based on 60 GHz WiFi based on directionally transmitting the RF signal in the direction of the RF signal diffuser. This may allows to limit the number of paths in the sensing area and may allow to reduce interference between different wireless channels.

For instance, 60 GHz WiFi may utilize beamforming of a transmitting node and/or a receiving node to limit the number of paths in the sensing area. At 60 GHz, a pattern emitted by a transmitting antenna of the transmitting node intrinsically becomes much more directional. In addition, at 60 GHz, longer-distance signal propagation becomes harder compared to 2.4 GHz due to the high signal absorption by oxygen in air.

In order to account for higher signal absorption, for, example, for performing RF-based sensing based on 60 GHz WiFi, specific RF sensing messages which do not serve a communication role may be used in order to improve signal-to-noise ratio (SNR). Using specific RF sensing messages may allow to adapt the transmission power without transmission power limitations for communication messages. An increased transmission power may compensate that the RF signal diffuser disperses the 60 GHz RF signal in many different spatial directions and thereby may increase an acceptable maximum path length from the transmitting node to the receiving node over point-to-point communication. Since the size of the reflective elements may be smaller for 60 GHz than for 2.4 GHz WiFi, the RF signal diffuser may be more compact, easing an unobtrusive integration of the reflective elements in a node, and in particular a luminaire.

Figure 3:
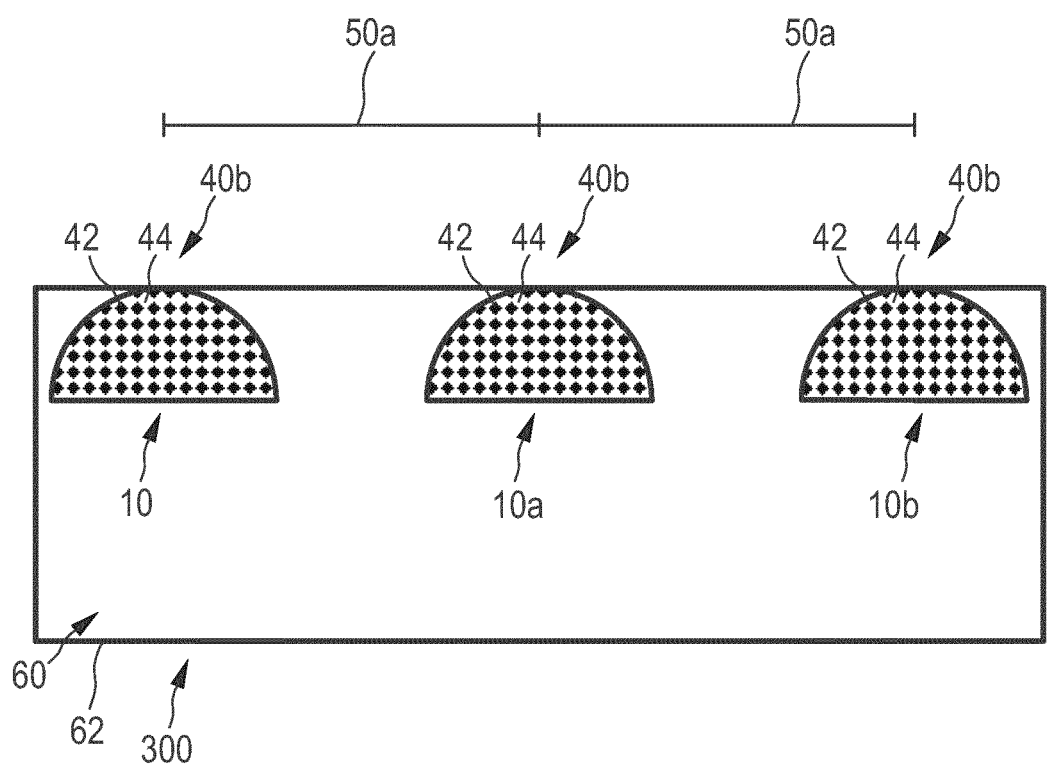
FIG. 3 shows schematically and exemplarily a third embodiment of an RF system.

FIG. 3 shows a third embodiment of an RF system in Form of CL system 300 for performing RF-based sensing in a sensing area 60 in a room 62 and for providing lighting in the room 62.

CL system 300 includes three nodes in form of first luminaire 10, second luminaire 10a, and third luminaire 10b. Each of the luminaires 10, 10a, and 10b includes an RF signal diffuser 40b for reflecting an RF signal in multiple directions in order to generate further additional paths for a multipath channel based on the RF signal. The luminaires 10, 10a, and 10b are arranged in a regular grid with predetermined distances 50a to their respective neighbor nodes. In this embodiment, the predetermined distances 50a correspond to distances between antenna arrays of the nodes 10, 10a, and 10b (not shown) and the predetermined distances 50a are 2 m. In other embodiments, the nodes may be arranged with another predetermined distance to their respective neighbor nodes. The regular grid may provide a grid of scattered RF beams creating a rich multipath environment for RF-based sensing.

In this embodiment, the RF signal diffuser 40b has a parabolic shape with reflective elements 42 arranged on a parabolic surface of the RF signal diffuser 40b. The RF signal diffuser 40b has a grid structure with holes 44 between the reflective elements 42 in order to allow RF signals from more directions to enter the RF signal diffuser 40.

In other embodiments, other RF signal diffuser designs may be used for generating the additional paths. The shape and size of the RF signal diffusers may be optimized for generating as many different signal reflections and signal scatterings as possible in order to provide a high number of different paths for the multipath channel in the sensing area. For example, a disco ball-like structure may be applied. A segmented luminaire-integrated RF signal diffuser may, for example, form a disco ball-like RF signal diffuser which reflects and/or scatters the incoming RF signal. In other embodiments, the RF sensing diffuser may, for example, be implemented as an intelligently designed luminaire housing, a trim ring of a downlight with reflective elements, a special spring structure of a recessed-mounted downlight or a specially designed luminaire heatsink.

Figure 4:
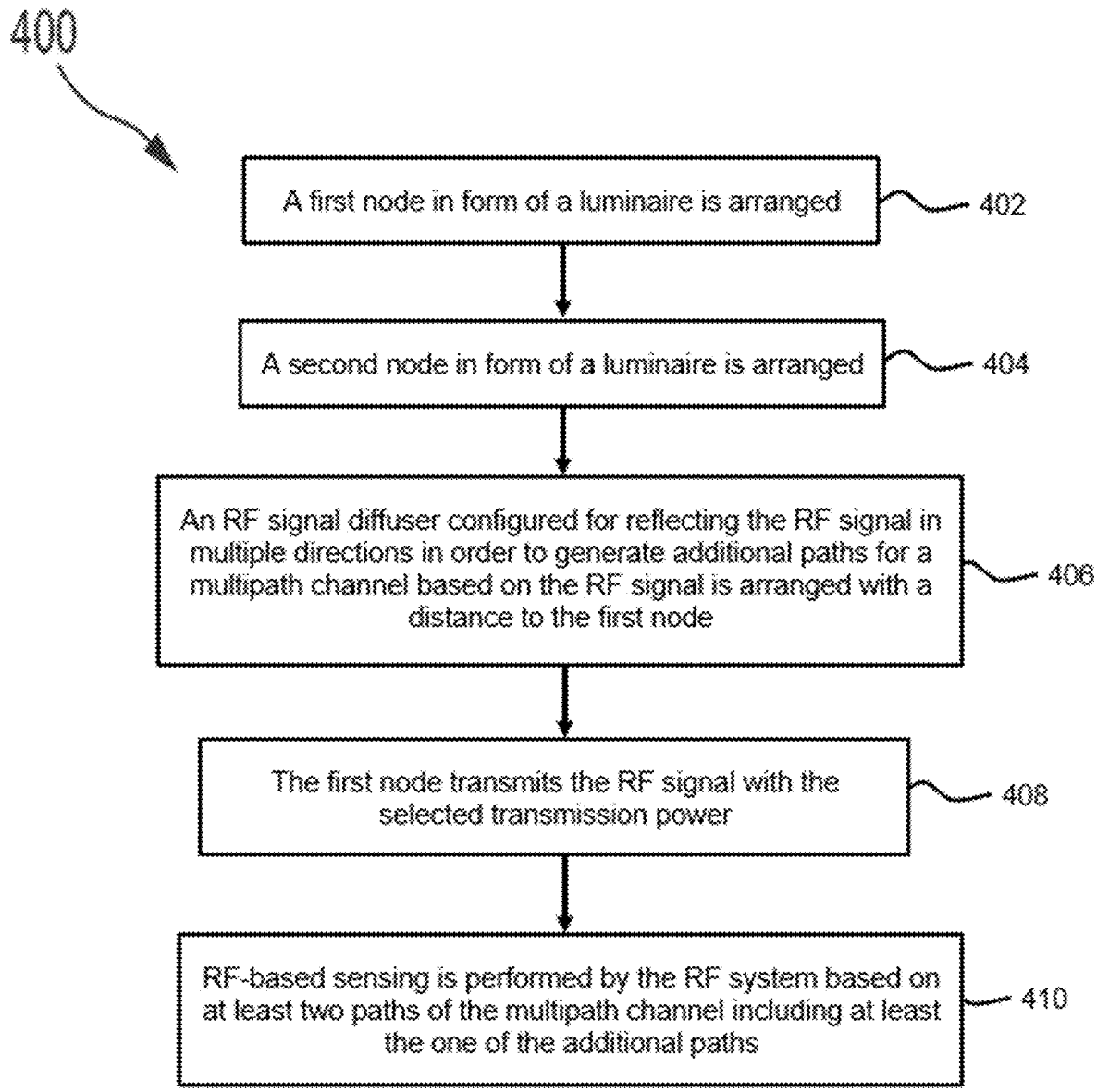
FIG. 4 shows an embodiment of a method for operating an RF system for performing RF-based sensing.

FIG. 4 shows an embodiment of the method 400 for operating an RF system, e.g., one of the CL systems 100, 200, or 300, shown in FIG. 1, 2, or 3, for performing RF-based sensing in a sensing area.

In step 402 a first node in form of a luminaire is arranged. The first node is configured for transmitting an RF signal.

In step 404, a second node in form of a luminaire is arranged. The second node is configured for receiving the RF signal.

In step 406, an RF signal diffuser configured for reflecting the RF signal in multiple directions in order to generate additional paths for a multipath channel based on the RF signal is arranged with a distance to the first node. Furthermore, in this embodiment, the RF signal diffuser is arranged with the same distance to the second node. In other embodiments, the RF signal diffuser may be included in the second node.

In this embodiment, the distance corresponds to a distance between an antenna array of the node and the reflecting surface of the RF signal diffuser. Furthermore, the distance is selected and the RF signal diffuser as well as the first node and the second node are configured such that at least one of the additional paths of the multipath channel has sufficient transmission power for performing RF-based sensing in the sensing area.

The RF signal diffuser may be optionally provided such that it reflects RF signals of a first wavelength and absorbs RF signals of a second wavelength. In order to provide the RF signal diffuser in this manner, for example, a material of the surface of the RF signal diffuser may be selected accordingly.

A shape of the RF signal diffuser, e.g., a customized shape, may optionally be adapted to optimize a distribution of the additional paths in the sensing area. The distribution may be based, for example, on a BIM model or any other 3D model of the sensing area. The 3D model may include, for example, information about the shape, size, materials, as well as fixed objects in the sensing area.

The RF signal diffuser may be provided with multiple reflective elements configured for reflecting the RF signal in order to reflect the RF signal in multiple direction and for generating the additional paths. Each of the reflective elements may be provided with a size adapted to a wavelength of the RF signal used for performing RF-based sensing, e.g., between 0.1 and 0.2 times the wavelength of the RF signal used for performing RF-based sensing. Alternatively, or additionally, orientations of the reflective elements may, for example, be adapted in order to adapt the distribution of the additional paths generated by the RF signal diffuser.

A number of the reflective elements, a size of the reflective elements, a material of the reflective elements, spatial orientations of the reflective elements, or any combination thereof may be provided based on the distance, a transmission angle, or the distance and the transmission angle between the RF signal diffuser and the first node.

In this embodiment, the RF signal diffuser is first arranged in the far field of the first node. Then a transmission power for the RF signal required to ensure that the at least one of the additional paths of the multipath channel has sufficient transmission power for performing RF-based sensing is selected based on the distance between the first node and the RF signal diffuser.

In step 408, the first node transmits the RF signal with the selected transmission power. The first node may optionally perform beamforming, e.g., in order to directionally transmit the RF signal in the direction of the RF signal diffuser.

The RF signal is transmitted to the second node which receives the RF signal via original paths as well as additional paths which are generated based on the RF signal interacting with the RF signal diffuser.

In step 410, RF-based sensing is performed by the RF system based on at least two paths of the multipath channel including at least the one of the additional paths. In this embodiment, the second node performs the RF-based sensing by analysing the RF signal received via multiple original paths and additional paths.

In other embodiments, RF-based sensing may be performed based on predefined RF signals including a chirp. Therefore, the first node may transmit the RF-based sensing as chirped RF signals, e.g., as RF signals including a chirp.

Additionally, or alternatively, the RF system may include multiple nodes. The nodes of the RF system may be provided in a regular grid with predetermined distances to their respective nearest neighbor nodes. Each of the nodes may be provided with an RF signal diffuser configured for reflecting the RF signal in multiple directions in order to generate further additional paths for the multipath channel based on the RF signal.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the RF signal diffuser is utilized in a building management system (BMS), a heating ventilation air conditioning (HVAC) system, or any other RF system.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like arranging a first node configured for transmitting an RF signal, arranging an RF signal diffuser configured for reflecting the RF signal in multiple directions in order to generate additional paths for a multipath channel based on the RF signal with a distance to the first node and configuring the RF signal diffuser and the first node such that at least one of the additional paths of the multipath channel has sufficient transmission power for performing RF-based sensing in the sensing area, performing RF-based sensing by the RF system based on at least two paths of the multipath channel including at least the one of the additional paths, et cetera performed by one or several units or devices can be performed by any other number of units or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to an RF system with a first node and an RF signal diffuser. The first node is configured for transmitting an RF signal. The RF signal diffuser is configured for reflecting the RF signal in multiple directions in order to generate additional paths for a multipath channel based on the RF signal. The RF signal diffuser and the first node are arranged with a distance to each other and are configured such that at least one of the additional paths of the multipath channel has sufficient transmission power for performing RF-based sensing in a sensing area. The RF system is configured for performing RF-based sensing based on at least two paths of the multipath channel including at least the one of the additional paths.

The invention claimed is:

1. A radio frequency system configured for performing radio frequency based sensing in a sensing area, the radio frequency system comprising:
   a first node configured for transmitting a radio frequency signal, and
   a radio frequency signal diffuser configured for reflecting the radio frequency signal in multiple directions in order to generate additional paths for a multipath channel based on the radio frequency signal,
   wherein the radio frequency signal diffuser and the first node are arranged in the radio frequency system with a distance to each other and are configured such that at least one of the additional paths of the multipath channel has sufficient transmission power for performing radio frequency based sensing in the sensing area, and
   wherein the radio frequency system is configured for performing radio frequency based sensing based on at least two paths of the multipath channel including at least the one of the additional paths; characterized in that
   wherein the radio frequency system includes a second node configured for performing radio frequency based sensing and wherein the second node includes the radio frequency signal diffuser, and wherein each of the nodes includes a radio frequency signal diffuser configured for reflecting the radio frequency signal in multiple directions in order to generate further additional paths for the multipath channel based on the radio frequency signal.

2. The radio frequency system according to claim 1, wherein the first node is configured for transmitting the radio frequency signal with a transmission power selected based on the distance between the radio frequency signal diffuser and the first node such that the at least one of the additional paths of the multipath channel has sufficient transmission power for performing radio frequency based sensing.

3. The radio frequency system according to claim 1, wherein the first node is configured for directionally transmitting the radio frequency signal in a direction of the radio frequency signal diffuser.

4. The radio frequency system according to claim 1, wherein the radio frequency signal diffuser has a customized shape which is adapted to optimize a distribution of the additional paths in the sensing area based on a three dimensional model of the sensing area.

5. The radio frequency system according to claim 1, wherein the radio frequency signal diffuser includes multiple reflective elements configured for reflecting the radio frequency signal and each of the reflective elements has a size adapted to a wavelength of the radio frequency signal used for performing radio frequency based sensing.

6. The radio frequency system according to claim 5, wherein a number of the reflective elements, a size of the reflective elements, a material of the reflective elements, spatial orientations of the reflective elements, or any combination thereof depend on the distance, a transmission angle, or the distance and the transmission angle between the radio frequency signal diffuser and the first node.

7. The radio frequency system according to claim 1, wherein the radio frequency system is configured for performing the radio frequency based sensing based on the radio frequency signal including a predefined chirp.

8. The radio frequency system according to claim 1, wherein the radio frequency signal diffuser is configured for reflecting radio frequency signals of a first wavelength and for absorbing radio frequency signals of a second wavelength.

9. The radio frequency system according to claim 1, wherein the nodes of the radio frequency system are arranged in a regular grid with predetermined distances to their respective nearest neighbor nodes.

10. A method for operating a radio frequency system for performing radio frequency based sensing in a sensing area, the method comprising the steps:
arranging a first node configured for transmitting a radio frequency signal,
arranging a radio frequency signal diffuser configured for reflecting the radio frequency signal in multiple directions in order to generate additional paths for a multipath channel based on the radio frequency signal with a distance to the first node and configuring the radio frequency signal diffuser and the first node such that at least one of the additional paths of the multipath channel has sufficient transmission power for performing radio frequency based sensing in the sensing area, and
performing radio frequency based sensing by the radio frequency system based on at least two paths of the multipath channel including at least the one of the additional paths; wherein the radio frequency system includes a second node configured for performing radio frequency based sensing and wherein the second node includes the radio frequency signal diffuser, and wherein each of the nodes includes a radio frequency signal diffuser configured for reflecting the radio frequency signal in multiple directions in order to generate further additional paths for the multipath channel based on the radio frequency signal.

11. The method according to claim 10, wherein the method comprises one or more of the steps:
selecting a transmission power for the radio frequency signal based on the distance between the radio frequency signal diffuser and the first node such that the at least one of the additional paths of the multipath channel has sufficient transmission power for performing radio frequency based sensing,
transmitting the radio frequency signal with the transmission power selected based on the distance between the radio frequency signal diffuser and the first node such that the at least one of the additional paths of the multipath channel has sufficient transmission power for performing radio frequency based sensing,
directionally transmitting the radio frequency signal by the first node in a direction of the radio frequency signal diffuser,
providing the radio frequency signal diffuser with a customized shape which is adapted to optimize a distribution of the additional paths in the sensing area based on a three dimensional model of the sensing area,
providing the radio frequency signal diffuser with multiple reflective elements configured for reflecting the radio frequency signal,
providing that each of the reflective elements has a size adapted to a wavelength of the radio frequency signal used for performing radio frequency based sensing,
providing the radio frequency signal diffuser with a number of the reflective elements, a size of the reflective elements, a material of the reflective elements, spatial orientations of the reflective elements, or any combination thereof based on the distance, a transmission angle, or the distance and the transmission angle between the radio frequency signal diffuser and the first node,
performing the radio frequency based sensing based on predefined radio frequency signals including a chirp,
configuring the radio frequency signal diffuser for reflecting radio frequency signals of a first wavelength and for absorbing radio frequency signals of a second wavelength,
providing a second node configured for performing radio frequency based sensing with the radio frequency signal diffuser,
arranging the nodes of the radio frequency system in a regular grid with predetermined distances to their respective nearest neighbor nodes, and
providing each of the nodes with a radio frequency signal diffuser configured for reflecting the radio frequency signal in multiple directions in order to generate further additional paths for the multipath channel based on the radio frequency signal.

12. A non-transitory computer readable medium comprising computer program code to perform the method of claim 10 when the computer program code is run on one or more processors.

* * * * *